(12) United States Patent
Ichii et al.

(10) Patent No.: US 7,302,184 B2
(45) Date of Patent: Nov. 27, 2007

(54) DATA COMMUNICATION SYSTEM

(75) Inventors: Eiji Ichii, Tokyo (JP); Shoji Hara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 602 days.

(21) Appl. No.: 10/378,793

(22) Filed: Mar. 4, 2003

(65) Prior Publication Data

US 2004/0042419 A1    Mar. 4, 2004

(30) Foreign Application Priority Data

Mar. 5, 2002    (JP)    ............................. 2002-058929

(51) Int. Cl.
*H04B 10/00*    (2006.01)
(52) U.S. Cl. ...................................................... 398/111
(58) Field of Classification Search ........ 398/115–131, 398/109, 111; 307/3; 340/825.69; 370/278, 370/310; 280/735
See application file for complete search history.

(56) References Cited

U.S. PATENT DOCUMENTS 4,408,185 A * 10/1983 Rasmussen ..................... 307/3
5,040,168 A * 8/1991 Maue et al. ................... 398/43
5,309,351 A * 5/1994 McCain et al. ................ 700/3
5,831,548 A * 11/1998 Fitzgibbon ............. 340/825.69

FOREIGN PATENT DOCUMENTS

| JP | 10-285114 | 10/1998 |
| JP | 11-053677 | 2/1999 |
| JP | 2000-183981 | 6/2000 |

* cited by examiner

*Primary Examiner*—Jason Chan
*Assistant Examiner*—Quan-Zhen Wang
(74) *Attorney, Agent, or Firm*—Cohen Pontani Lieberman & Pavane LLP (57) ABSTRACT

A data communication system comprising a terminal unit for generating light signals responsive to status of switches and a control unit for receiving the signals spatially propagated and controlling operation of a predetermined load, wherein switches 11 and 12 are interposed between plus and minus lines 51 and 52 as power lines for supplying electric power from the control unit to the terminal unit, and connected in series with respective resistors R1 and R2 having different values of resistance, and the minus line is grounded in the control unit 30 through resistor R0. Potential of the minus line changes in response to switches 11 and 12, and electronic signals indicative of the status of the switches are transmitted to the control unit separately from the light signals. Thus, even if the spatial propagation of the light signals is interrupted, the control over the operation of the load is secured.

2 Claims, 4 Drawing Sheets

|  | D7 | D6 | D5 | D4 | D3 | D2 | D1 | D0 |
|---|---|---|---|---|---|---|---|---|
| Data1 | RCL- | RCL+ | SLD- | SLD+ | LFT- | LFT+ | FRV- | FRV+ |
| Data2 | 1 | 1 | 1 | 1 | 1 | 1 | 1 | 1 |

FIG. 5

DATA COMMUNICATION SYSTEM

BACKGROUND OF THE INVENTION

1. Field of the Invention

The present invention relates to a data communication system suitable for securely transmitting signals (data) indicative of status of a plurality of switches located in a terminal unit to a control unit for controlling operation of a predetermined load.

2. Description of the Prior Art

In recent years, it has been common to control the operation of various kinds of loads, such as a motor and the like, by using a LAN system mounted in an automobile. For example, the activation of a motor for operating a vehicle seat is controlled by tripping the switches mounted in the seat to adjust the position and posture of the seat. In this case, generally, a wire harness is used to connect a control unit for controlling the operation of the predetermined load (motor for operating the seat) with a terminal unit comprising a plurality of switches and sensors. Through the wire harness, switch signals and sensor signals which are detected in the terminal unit are transmitted to the control unit.

Along with an increase of the controlled objects (loads), however, the number of signals (amount of data) in multiplied, which is accompanied by the growth of the lying amount of wire harnesses (the number of signal wires). Given this factor, it is proposed to transmit data (switch signals or sensor signals) from the terminal unit to the control unit through spatial propagation using light signals, such as infrared ray lights or the like, in order to reduce the lying amount of the wire harnesses.

The terminal unit which performs the foregoing optical communication comprises a processing unit (CPU) as main part, he processing unit driving a light-emitting device, such as an infrared-emitting diode or the like, according to the status of a plurality of switches and transmitting light signals of the predetermined frame structure. On the other hand, the control unit comprises an electronic control unit (ECU) as major component, the electronic control unit receiving the light signals by means of a light-receiving device, such as a photo transistor or the like, detecting the switch status, and then controlling the activation of the motor for operating the seat on the basis of the result of the detection.

In the communication system which spatially propagates the light signals, however, there is a fear, for example, that the baggage placed near the seat enters the propagation space of the light signals between the light-emitting device and the light-receiving device. If this happens, the light signals transmitted from the terminal unit is blocked by the baggage (obstacle), so that it is impossible to detect the light signals (switch status) in the control unit. In case that the processing unit (CPU) located in the terminal unit breaks down or that the light-emitting device stops emitting lights, no light signal is output, which makes it impossible for the control unit to detect the switch status.

SUMMARY OF THE INVENTION

An object of the present invention is to resolve the above problems and provide a data communication system capable of securely detecting status (operation status) of switches located in a terminal unit by means of a control unit even if data communication via light signals transmitted between the terminal unit and the control unit is interrupted.

To that end, the data communication system according to the present invention is suitable, for example, to control a position and posture of a seat in an automobile. The data communication system basically comprises, for example, a terminal unit for generating signals responsive to the status of a plurality of switches mounted in a vehicle seat, a control unit for controlling operation of a predetermined load, such unit an a motor for operating the seat or the like, according to the above signals transmitted from the terminal unit, and power supply lines for supplying power supply required for operation of the terminal unit from the control unit to the terminal unit.

The terminal unit comprises light signal-transmitting means for generating light signals responsive to the actuation of the switches and spatially propagating the light signals to the control unit and electronic signal-transmitting means for generating electronic signals responsive to the actuation of the switches and transmitting the electronic signals to the control unit through the power supply lines. The control unit, on the other hand, comprises light signal-detecting means for detecting the light signals transmitted by the light signal-transmitting means and controlling the operation of the load and electronic signal-detecting means for detecting the electronic signals transmitted by the electronic signal-transmitting means through the power supply line and controlling the operation of the load when the transmission of the light signals from the terminal unit comes to a halt.

In a preferable embodiment of the present invention, the power supply lines comprise a plus and a minus line supplying DC power from the control unit to the terminal unit, the minus line being grounded via a first resistor in the control unit. The electronic signal-transmitting means located in the terminal unit comprises a plurality of second resistors having different values of resistance, the second resistors being connected in series to the respective switches. The series circuits of the respective switches and the respective second resistors are interposed between the plus line and the minus line.

In another preferable embodiment of the present invention, the power supply lines comprise the plus and the minus line supplying DC power from the control unit to the terminal unit and an exclusive line for supplying a predetermined voltage to the terminal unit through the first resistor in the control unit. The electronic signal-transmitting means located in the terminal unit comprises a plurality of second resistors having different values of resistance, the second resistors being connected in series to the respective switches. The series circuits of the respective switches and the respective second resistors are interposed between the exclusive line and the minus line.

With the data communication system according to the present invention, potentials of the minus and exclusive lines serving as the power supply lines change by the switch status, and the switch status is informed to the control unit in the form of electronic signals, so that the switch status can be reliably detected on the basis of the electronic signals in the control unit even if there occurs a trouble in data communication via light signals. Therefore, the control unit can securely control the operation of the load according to the switch status.

If the system is so designed as to inform in parallel the status of only highly important switches, which are indispensable for controlling the operation of the load, among the switches disposed in the terminal unit, to the control unit in the form of the electronic signals together with the light signals, it becomes possible to heighten reliability of the data communication between the terminal unit and the control unit without difficulty.

DETAILED DESCRIPTION OF THE INVENTION

A data communication system according to an embodiment of the present invention will be described below with reference to drawings by taking as an example a system which is applicable to control of movements of a seat (power seat) in an automobile or the like. In addition, the movements of the seat include, for example, forward and rearward sliding movements (SLD) of the whole seat, a reclining movement (RCL) of a backrest portion, a front vertical movement (FRV) and lifting movement (LFT) of a seat portion. These movements are performed by activating respective dedicated motors.

Figure 1:
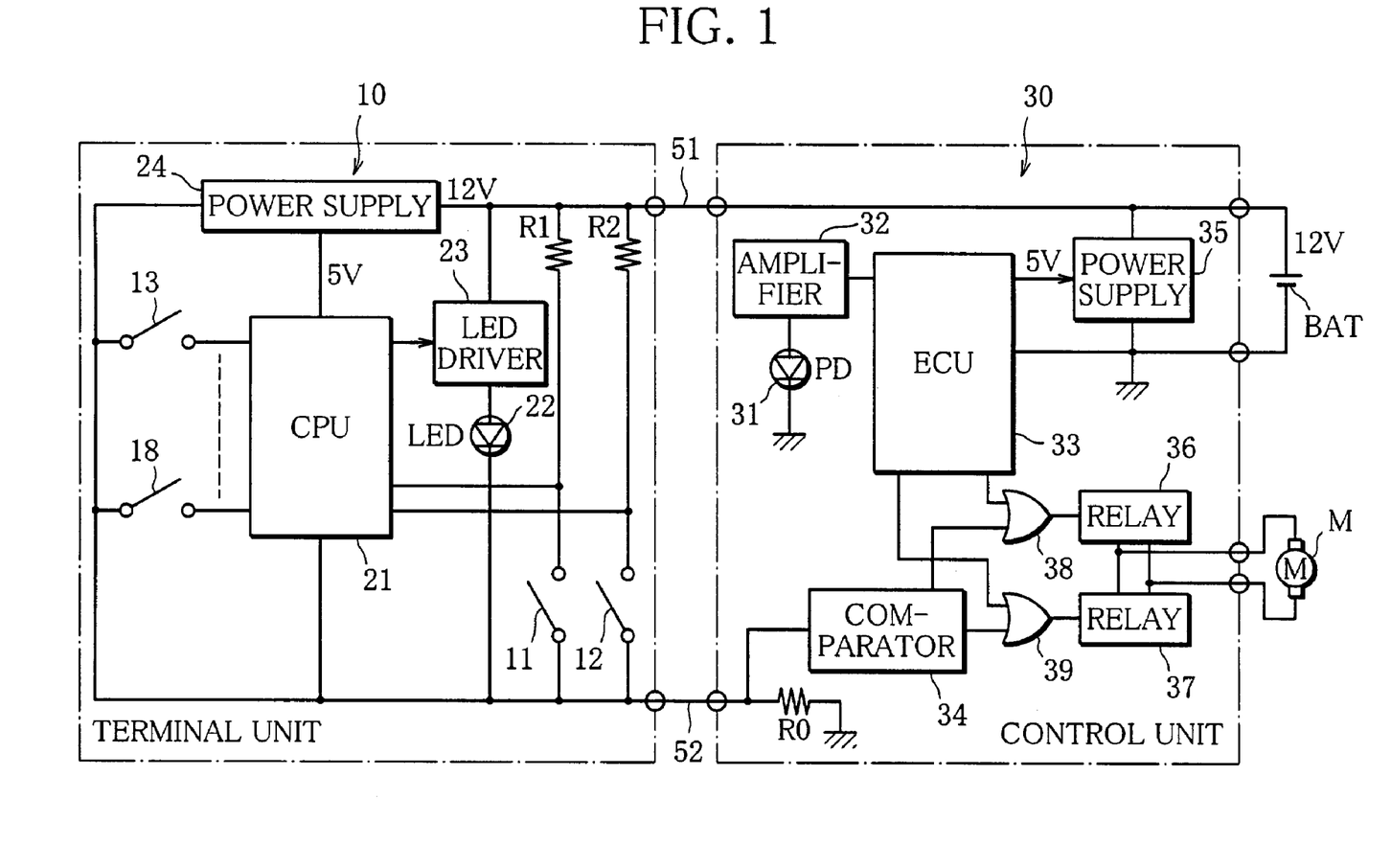
FIG. 1 is a schematic view showing a main structure of a data communication system according to a first embodiment of the present invention.

FIG. 1 schematically illustrates a main structure of a data communication system according to a first embodiment of the present invention. In FIG. 1, a reference numeral 10 represents a terminal unit for generating and transmitting light signals responsive to status of a plurality of (eight) switches 11 through 18 which are mounted in a seat, not shown. A reference numeral 30 designates a control unit for controlling operation of a motor M for moving the seat as a predetermined load according to data indicative of the status of switches 11 through 18, the data being transmitted from the terminal unit 10. Additionally, FIG. 1 shows only the motor M for sliding the seat in a forward/rearward direction and a control circuit portion thereof.

The terminal unit 10 comprises a processing unit (CPU) 21 as main component, the processing unit (CPU) 21 detecting the status of the switches 11 through 18. The processing unit (CPU) 21 controls operation of an LED driver circuit 23 according to the status of the switches 11 through 18. An infrared-emitting diode (LED) 22, which is a light-emitting device, is driven by the LED driver circuit 23, thereby generating light signals (light signal-transmitting means).

Moreover, the terminal unit 10 is supplied with, for example, DC power of 12 V, from the control unit 30 through a pair of power supply lines comprising a plus line 51 and a minus line 52. The terminal unit 10 operates by using the DC power of 12 V as driving source. Particularly, the processing unit (CPU) 21 operates through the use of a stabilized DC voltage of 5 V as driving source, the DC voltage being created from the DC power of 12 V by a power supply circuit 24.

The switch 11 for detecting a forward movement (SLD+) of the seat and the switch 12 for detecting a rearward movement (SLD−) thereof are connected in series with respective resistors (second resistors) R1 and R2 having different values of resistance. The series circuit of the switch 11 and the resistor R1 and that of the switch 12 and the resistor R2 are interposed between the plus line 51 and the minus line 52. The switches 11 and 12 perform a function in lowering potentials V1 and V2 of respective series connection points which connect these switches to the respective resistors R1 and R2 to a potential of the minus line 52 by being made conductive (ON). In a cut-off (OFF) state, on the contrary, the switches 11 and 12 pull up the potentials V1 and V2 of the above connection points to a potential (12 V) of the plus line 51 (electronic signal-transmitting means). The processing unit 21, by detecting the potentials V1 and V2 of the connection points of the switches 11 and 12, respectively, finds the status (ON/OFF) of the switches 11 and 12, and controls the operation of the LED driver circuit 23. In addition, the switches 11 and 12 are designed to alternatively designate the forward movement (SLD+) and rearward movement (SLD−) of the seat, respectively, and therefore, are never brought into a conductive (ON) state at a time.

The other switches 13 through 18, which detect a reclining direction (RCL+/RCL−) and the like of the seat, respectively, are interposed between a plurality of sensing ports located in the processing unit 21 and the minus line 52. The processing unit 21 detects the status (ON/OFF) of the switches 13 through 18, depending on whether a potential of each sensing port is lowered to the potential of the minus line 52 through the respective switches 13 through 18 (activation of the switches) or each of the sensing ports is open (cutoff of the switches).

According to the status (ON/OFF) of the switches 11 through 18 which is detected in the above-described manner, the processing unit 21 controls the operation of the LED driver circuit 23 and transmits the light signals by driving an LED 22. The transmission of the light signals by driving the LED 22 is carried out, for example, after preparation of a data list of a frame structure shown in FIG. 2.

Figure 2:
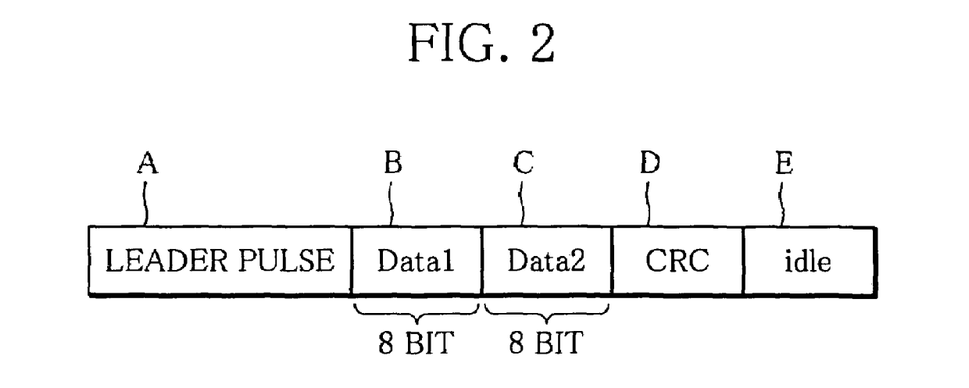
FIG. 2 shows a frame structure of a data communication system using light signals.

Specifically, the transmission frame comprises a leader pulse A of a predetermined bit length which is used for pre-processing prior to infrared data communication, data B and C of 2 bits each, an error correction sign D for a CRC code and the like with respect to the data B and C, and an idle region E as spare.

Figure 3:
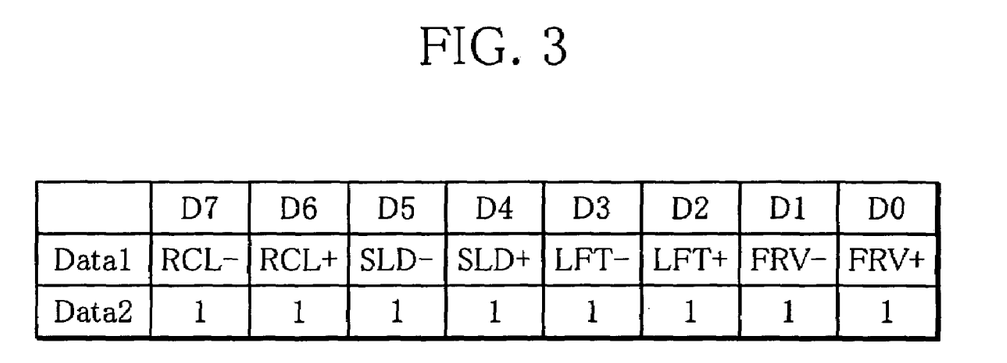
FIG. 3 shows an example of allocation of data which indicate status of a plurality of switches to a transmission frame.

In this embodiment, the eight switches 11 through 18, which detect the forward/rearward and upward/downward movements (+/−) of the sliding (SLD), reclining (RCL), front vertical (FRV) and lifting (LFT) operations, respectively, are simply disposed in the terminal unit 10. Therefore, the switches 11 through 18 are made correspond to respective bits of the data B consisting of 8 bits, for example, as shown in FIG. 3. The bit(s) corresponding to the on-state switch(es) among the switches 11 through 18 is(are) determined to be [1], whereas the bit(s) corresponding to the off-state switch(es) is(are) determined to be [0]. In this manner, the data B indicative of the status of the switches 11 through 18 are created. The transmission frame including the data B is transmitted as time-series data. In addition, since the data C is irrelevant from the control of movements of the seat, every bit thereof is stored with data [1] in this embodiment.

Although the terminal unit 10 is basically constructed to transmit the light signals in the above-described way, the control unit 30 comprises a photodiode (PD) 31 serving as a light-receiving device for receiving the light signals transmitted from the terminal unit 10 and an electronic control unit (ECU) 33 for inputting receiver signals through an amplifier 32, the receiver signals being photoelectrically converted and output by the PD 31 according to the received light signals, (light signal-detecting means). The control unit 30 operates in response to the DC power of 12 V supplied from a battery BAT. Specifically, the electronic control unit (ECU) 33, the amplifier 32, an undermentioned comparator 34, and the like, each operate through use of stabilized DC voltage of 5 V as driving source, the DC voltage being produced by a power supply circuit 35 to which the DC power of 12 V is input. Another function of the control unit 30 in to supply the DC power of 12 V to the terminal unit 10 through the power supply lines comprising the plus line 51 and the minus line 52.

The electronic control unit 33 alternatively drives relays 36 and 37 for controlling conduction (activation) of the motor M according to the data received through the photodiode (PD) 31. The alternative operation of the relays 36 and 37 brings the motor M into normal or reverse rotation. The relays 36 and 37 have a function in alternatively applying the DC power of 12 V supplied from the battery BAT to the motor M. Particularly, the relay 36 causes the motor M to rotate in the normal direction by applying the above DC power to the motor M without modification, whereas the relay 37 makes the motor M rotate in the reverse direction by applying the DC power to the motor M after reversing polarities of the DC power. Although FIG. 1 only illustrates the relays 36 and 37 for controlling the activation of the motor M which makes the seat slide in the forward/rearward direction, there are disposed in the same manner other relays corresponding to respective motors which bring the seat into the reclining, front vertical and lifting movements. respectively. The operation of these relays is also controlled by the electronic control unit 33.

Herein, a feature of the data communication system according to the present invention is that the minus line 52 is grounded through a resistor (first resistor) R0 in the control unit 30, and the minus line 52 is designed to have a floating potential. The potential of the minus line 52 (voltage produced in the resistor R0) changes by an electric current which stationarily flows in the terminal unit 10 (CPU 21). an electric current which flows through the resistors R1 and R2 in response to conduction (ON) of the switches 11 and 12 in the terminal unit 10, and an electric current which flows when the LED 22 is driven.

More specifically, on the premise that the electric current which stationarily flows in the terminal unit 10 (CPU 21) is left aside, when the switches 11 and 12 are both in the cut-off (OFF) state, potential V0 of the minus line 52 can be considered as follows:

$V0 \approx 0$

On the contrary, when the switch 11 is conductive (ON), power supply voltage Vcc (12 V) applied to the plus line 51 is divided by the resistor R1 (value of resistance; r1) connected in series to the switch 11 and the resistor R0 (value of resistance; r0) connected to the minus line 52, and thus potential V11 of the minus line 52 can be expressed as follows:

$V11 = Vcc \cdot r0/(r1+r0)$

Furthermore, when the switch 12 is conductive (ON), the power supply voltage Vcc (12 V) applied to the plus line 51 is divided by the resistor R2 (value of resistance; r2) connected in series to the switch 12 and the resistor R0 connected to the minus line 52, so that potential V12 of the minus line 52 is defined by the following expression.

$V12 = Vcc \cdot r0/(r2+r0)$

As described above, the resistors R1 and R2 connected in series to the respective switches 11 and 12 have different values of resistance r1 and r2, respectively. Therefore, when the switches 11 and 12 are conductive (ON), the potentials V11 and V12 of the minus line 52 differ from each other. The control unit 30 monitors the potentials V11 and V12 of the minus line 52 which change in response to the status of the switches 11 and 12, thereby detecting the status (ON/OFF) of the switches 11 and 12 on the basis of the potentials (electronic signal-detecting means).

In other words, the resistors R1 and R2 connected in series to the respective switches 11 and 12 cause the potential of the minus line 52 to change by the status of the switches 11 and 12. The resistors R1 and R2 serve to inform the status (ON/OFF) of the switches 11 and 12 to the control unit 30 in the form of electronic signals through the minus line 52. In the control unit 30, there is mounted a comparator 34, which compares the potential of the minus line 52 (voltage produced in the resistor R0) with a prescribed threshold value to determine the potential level thereof, thereby finding the status of the switches 11 and 12. Moreover, the comparator 34 alternatively activates the relays 36 and 37 for controlling the conduction (activation) of the motor M according to the detected status (ON/OFF) of the switches 11 and 12, and makes the motor M rotate in either normal or reverse direction.

A relay activation signal which is output from the comparator 34 and that from the ECU 33 are added to the relays 36 and 37 through OR-circuits 38 and 39, respectively. Accordingly, the relays 36 and 37 operate upon receipt of at least either of the relay activation signal which is output from the comparator 34 in response to the electronic signals and that from the ECU 33 in response to the light signals. As a consequence, for example, even if the data communication via the light signals is not normally performed, it is possible to activate the motor M according to the status of the switches 11 and 12 in response to the electronic signals transmitted through the minus line 52.

Figure 4:
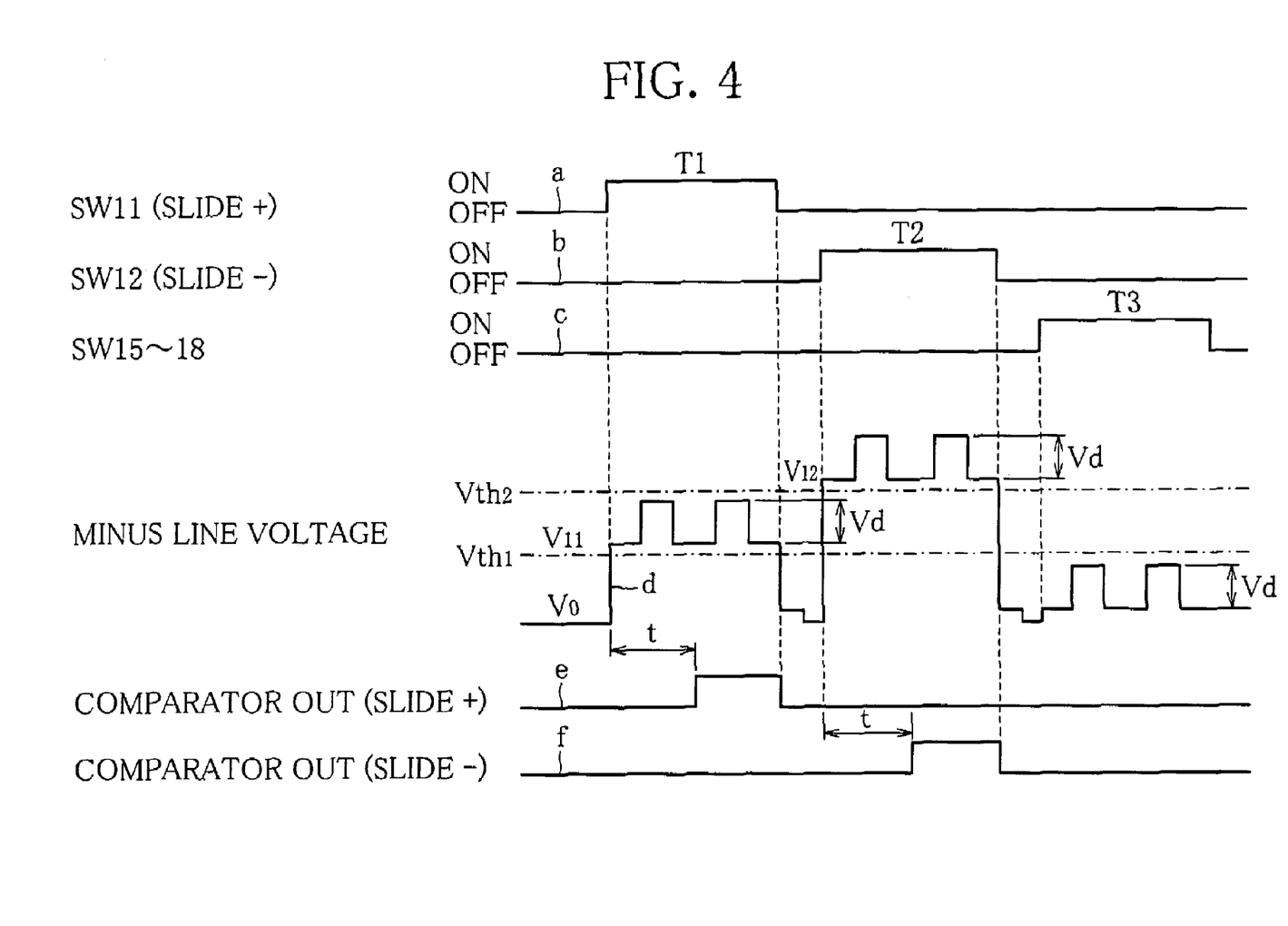
FIG. 4 is a diagram showing the switch status in the data communication system illustrated in FIG. 1 and changes of electronic signals (potentials) responsive to the switch status.

Described below with reference to FIG. 4 are more details about the detection of the status (ON/OFF) of the switches 11 and 12, which is carried out by the comparator 34 on the basis of the potential of the minus line 52 (voltage produced in the resistor R0). In addition, the description will be provided on the premise that the values of resistance r1 and r2 of the respective resistors R1 and R2 have a relation which is defined as (r1>r2).

If the switch 11 located in the terminal unit 10 is kept conductive (ON) over a period T1 as shown by Chart a, the potential of the minus line 52 changes from the potential V0 in the cut-off (OFF) state to the potential V11 in response to the conduction (ON) of the switch 11 as shown by Chart d. At this moment, the CPU 21 detects the status of the switches 11 through 18 and drives the LED 22 to transmit the light signals. Thus, at the time of transmission of the light signals, an electric current ld which runs through the LED 22 also flows into the resistor R0 via the minus line 52. For this reason, the potential of the minus line 52 is heightened by amount of (r0×ld=Vd). Therefore, in the period T1 when the switch 11 is on, the potential of the minus line 52 changes between the potential V11 and a potential (V11+Vd) as shown by Chart d.

On the other hand, in case that the switch 12 is maintained conductive (ON) over another period T2 as shown by Chart b, the potential of the minus line 52 changes from the potential V0 in the cut-off (OFF) state to the potential V12 in response to the conduction (ON) of the switch 12 as shown by Chart d. Moreover, the potential of the minus line 52 changes between the potential V12 and a potential (V12+Vd) in response to the transmission of the light signals as shown by Chart d.

Furthermore, as shown by Chart c, even if the other switches 13 through 18 are brought into a conductive (ON) state over further another period T3, this does not greatly change the potential of the minus line 52 from the potential V0. In this case, as shown by Chart d, the potential of the minus line 52 merely changes between the potential V0 and a potential (V0+Vd) in response to the transmission of the light signals.

Given this factor, in order to securely detect only significant changes (voltages V11 and V12) of the potential of the minus line 52, which are caused in response to the conduction (ON) of the switches 11 and 12, without reacting to a change (voltage Vd) of the potential of the minus line 52 caused by the conductive current ld of the LED 22 which accompanies the above optical communications, the values of resistance r1 and r2 of the resistors R1 and R2 are determined to have the following relations:

$$(V11-V0) > Vd$$

$$(V12-V11) > Vd$$

In the comparator 34, for the purpose of securely detecting the conductive (ON) state of the switches 11 and 12, determination threshold values Vth1 and Vth2 are so defined as to satisfy the following expressions to determine the potential of the minus line 52.

$$(V0+Vd) < Vth1 < V11$$

$$(V11+Vd) < Vth2 < V12$$

Moreover, the comparator 34 outputs the result of the determination after a prescribed delay time t which is computed from the moment when the change of the potential of the minus line 52 is detected, for example, as shown by Charts e and f in FIG. 4. That is, the comparator 34 delays, by the prescribed time t, outputting the activation signals to be given to the relays 36 and 37. The delay time t is predetermined to include time required for the ECU 33 to detect the status of the switches 11 and 12 through the light signal communication and output the activation signals with respect to the relays 36 and 37. The above-described timing control (delay control of electronic signals) prevents the problem that the motor M is activated solely by output of the comparator 34 before the activation of the motor M is carried out by the control operation of the ECU 33 through the regular data communication using light signals.

Consequently, according to the data communication system which is constructed as described above, when the system operates normally, the control unit 30 detects the status of the switches 11 through 18 through the data communication in which the light signals transmitted from the terminal unit 10 are spatially propagated. Then, according to the status (ON/OFF) of the switches 11 through 18, the operation of the relays 36 and 37 and the like is controlled to activate the motor M. However, in cases where baggage or the like is placed between the control unit 30 and the terminal unit 10, thus obstructing the propagation path of the light signals and hindering the transmission of the light signals, or in cases where there incurs a trouble in the function of the CPU 21 located in the terminal unit 10, and thus the terminal unit 10 does not send any more light signals, the control unit 30 detects the status of the switches 11 and 12 on the basis of the potential of the minus line 52. An a result, even if the transmission of the light signals is discontinued, the control unit 30 is capable of activating the motor M by controlling the operation of the relays 36 and 37 in response to the electronic signals.

As a consequence it is possible to effectively back up the data communication which is accomplished through the spatial propagation of the light signals by using the electronic signals (potential levels) given by the terminal unit 10 via the minus line 52. This heightens the reliability of the data communication between the terminal unit 10 and the control unit 30. Particularly, the electronic signals are generated as described above according to the status (conduction) of the highly important switches (switches 11 and 12 in this embodiment) among the switches 11 through 18 located in the terminal unit 10, and then transmitted to the control unit 30. Thus, it is possible to carry out, for example, a minimal function including the forward/rearward movement of the seat. Therefore, it can be noted that the data communication system according to the present invention has considerable practical assets.

Figure 5:
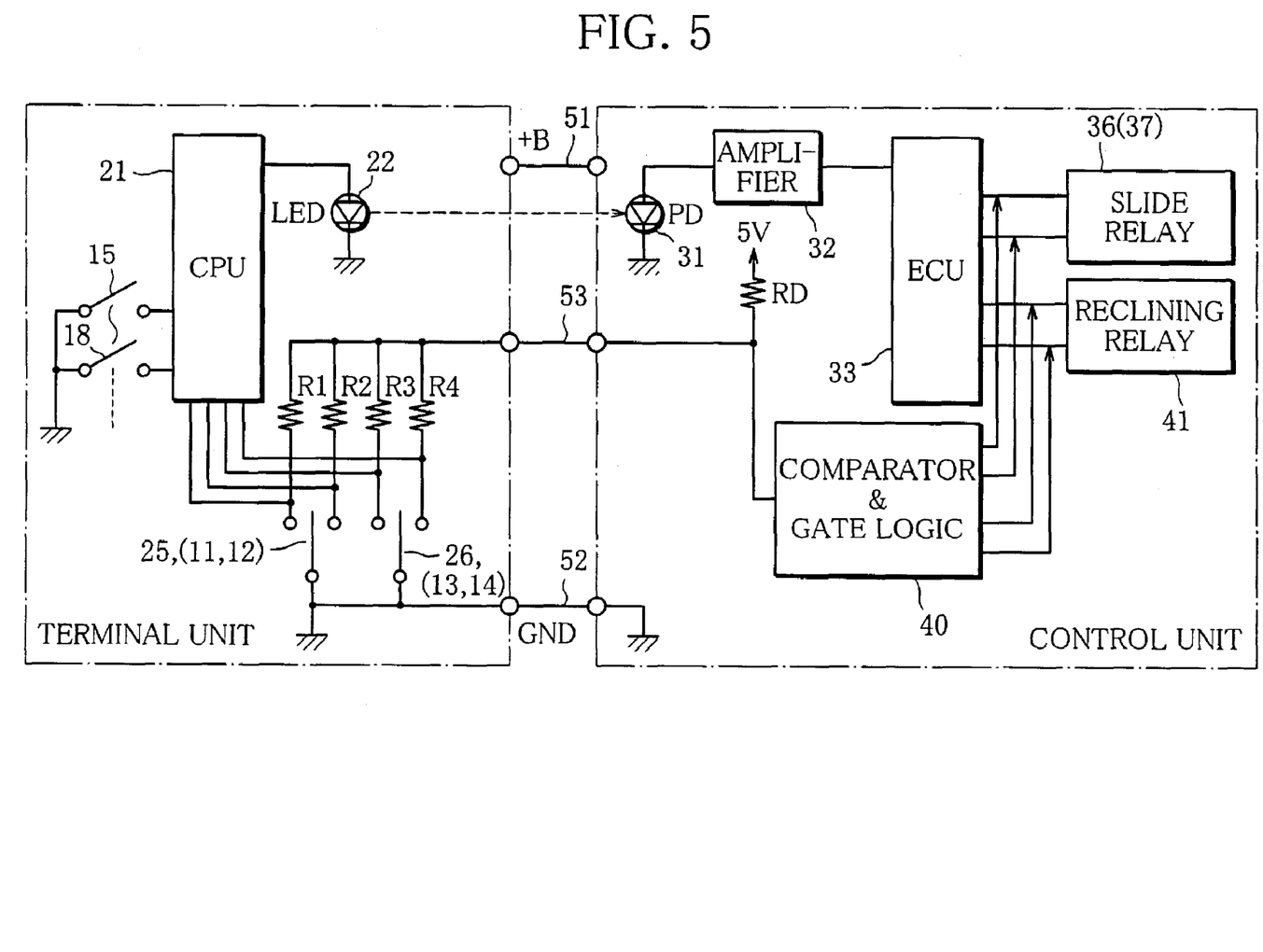
FIG. 5 is a schematic view showing a main structure of a data communication system according to a second embodiment of the present invention.

The data communication system of the present invention may be constructed as illustrated in FIG. 5.

FIG. 5 schematically shows a main structure of a data communication system according to a second embodiment of the present invention. Elements of FIG. 5 having a one-to-one functional correspondence with those of FIG. 1 are given the same reference numerals.

This system is so constructed as to inform the status of the switches 13 and 14 for controlling the reclining movement of the seat to the control unit 30 in the form of electronic signals, in addition to the status of the switches 11 and 12 for causing the seat to slide in the forward/rearward direction. The switches 11 and 12 are realized as a double pole switch 25 which is made conductive with respect to two make contact points alternatively. The switches 13 and 14 are similarly realized as a double pole switch 26.

The data communication system according to the second embodiment is provided with an exclusive line 53 between the terminal unit 10 and the control unit 30 in addition to the plus line 21 and the minus line 52 as power lines. The exclusive line 53 is subjected to application of a prescribed DC voltage (of 5 V, for example) through the predetermined resistor (first resistor) R0 in the control unit 30.

Connected in series to the make contact points (corresponding to the switches 11, 12, 13 and 14) of the respective switches 25 and 26 are resistors (a plurality of second resistors) R1, R2, R3 and R4 having different values of resistance. The resistors R1, R2, R3 and R4 have a common contact point which is connected to the exclusive line 53, and the switches 25 and 26 have a common contact point which is grounded through the minus line 52. In other words, the series circuits of the switches 25 and 26 and the resistors R1, R2, R3 and R4 are interposed between the exclusive line 53 and the minus line 52. By changing a potential (voltage of the resistor R0) of the exclusive line 53 according to the status of the switches 25 and 26, the status of the switches 25 and 26 is informed to the control unit 30 in the form of electronic signals.

With the foregoing structure, when the switches 25 and 26 are both in a cut-off (OFF) state, the exclusive line 53 is pulled up via the resistor R0, so that the potential of the exclusive line 53 becomes the prescribed applied voltage Vref (5 V). On the other hand, if the switch 25 is made conductive with respect to a first make contact point (which corresponds to the conduction of the switch 11), an electric current runs through the resistor R1 in response, and the applied voltage Vref is divided by the resistors R1 and R0. The exclusive line 53 at this moment has a potential V21 which is defined as follows:

$$V21 = Vref \cdot r1/(r0+r1)$$

In case that the switch 25 is conductive with respect to a second make contact point (which corresponds to the conduction of the switch 12), the applied voltage Vref is divided by the resistors R2 and R0. Accordingly, the exclusive line 53 at the moment has a potential V22 defined as in the following expression.

$$V22 = Vref \cdot r2/(r0+r2)$$

Similarly, when the switch 26 is conductive with respect to the first make contact point (which corresponds to the conduction of the switch 13), the applied voltage Vref is divided by the resistors R3 and R0 in response. At this moment, the exclusive line 53 has a potential V23 which is determined as follows:

$$V23 = Vref \cdot r3/(r0+r3)$$

Moreover, if the switch 26 is conductive with respect to the second make contact point (which corresponds to the conduction of the switch 14), the applied voltage Vref is divided by the resistors R4 and R0 in response. Therefore, the exclusive line 53 at the moment has a potential V24 defined by the following expression.

$$V24 = Vref \cdot r4/(r0+r4)$$

Consequently, if the values of resistance r1, r2, r3 and r4 of the respective resistors R1, R2, R3 and R4 are predetermined to have a relation which satisfies an expression, for example, $$r1 > r2 > r3 > r4$$

the potential of the exclusive line 53 changes in the condition below according to the status of the switches 25 and 26.

$$Vref > V21 > V22 > V23 > V24$$

As a result, it is possible to detect the status of the switches 25 and 26 in the same manner as the foregoing embodiment by determining the potential of the exclusive line 53.

Since the LED 22 is driven by using the DC power supplied from the power supply lines in the above system the driving electric current ld does not affect the potential of the exclusive line 53. There is a possibility however, that the switch 25 for making the seat slide and the switch 26 for making the seat recline are simultaneously made conductive (ON). Therefore it is required to detect the status of the switches 25 and 26 as well.

In this case, the values of resistance r1, r2, r3 and r4 of the respective resistors R1, R2, R3 and R4 are determined so that the undermentioned potentials of the exclusive line 53 have the relations described below.

(a) a potential V31 of the exclusive line 53 at a time when the switch 25 is conductive with respect to the first make contact point (which corresponds to the conduction of the switch 11), and the switch 26 is also conductive with respect to the first make contact point (which corresponds to the conduction of the switch 13):

$$V31 = Vref \cdot r1 \cdot r3/[r0 \cdot (r1+r3)+r1 \cdot r3]$$

(b) a potential V32 of the exclusive line 53 at a time when the switch 25 is conductive with respect to the first make contact point (which corresponds to the conduction of the switch 11), and the switch 26 is conductive with respect to the second make contact point (which corresponds to the conduction of the switch 14):

$$V32 = Vref \cdot r1 \cdot r4/[r0 \cdot (r1+r4)+r1 \cdot r4]$$

(c) a potential V33 of the exclusive line 53 at a time when the switch 25 is conductive with respect to the second make contact point (which corresponds to the conduction of the switch 12), and the switch 26 is conductive with respect to the first make contact point (which corresponds to the conduction of the switch 13):

$$V33 = Vref \cdot r2 \cdot r3/[r0 \cdot (r2+r3)+r2 \cdot r3]$$

(d) a potential V34 of the exclusive line 53 at a time when the switch 25 is conductive with respect to the second make contact point (which corresponds to the conduction of the switch 12), and the switch 26 is also conductive with respect to the second make contact point (which corresponds to the conduction of the switch 14):

$$V34 = Vref \cdot r2 \cdot r4/[r0 \cdot (r2+r4)+r2 \cdot r4]$$

The above potentials may be determined to have a relation, for example, $$V21 > V31 > V22 > V32 > V23 > V33 > V24 > V34$$

or $$V21 > V22 > V23 > V24 > V31 > V32 > V33 > V34$$

In the control unit 30, the potential of the exclusive line 53 is determined by a comparator-and-gate logic circuit 40 to control the operation of the relays 36 and 37 for the sliding movement of the seat and the operation of the relay 41 for the reclining movement, on the basis of the result of the determination. In this case, the relay activation signal which is output from the comparator-and-gate logic circuit 40 and that from the ECU 33 in response to the light signals may be each subjected to wired OR operation and added to the relays 36, 37 and 40.

The above-described system has the same effect as the foregoing embodiment, the system being so constructed as to change the potential of the exclusive line 53 by the status of the switches 25 and 26 and transmit the electronic signals to the control unit 30. Although it is required in the above case to lay the exclusive line 53 as extra line between the terminal unit 10 and the control unit 30, the laying of the minus line 52 is unnecessary if a ground potential thereof is defined by means of chassis of a vehicle or the like. Thus, it is possible to practically repress an increase in the number of lines of the wire harness. Furthermore, the use of a three-core cable as power supply line enables the construction of the system without incurring a substantial increase in cost.

The present invention is not limited to the aforementioned embodiments. Although this specification takes the control of movements of a vehicle seat as an example, the present invention is also applicable to, for example, control of operation of an industrial robot. Moreover, as to the switch status which is indicated by the electronic signals transmitted as backup with respect to the light signals, the status of only highly important (high-priority) switches may be sufficient. Furthermore, the present invention may be variously modified without departing from the gist thereof.

As explained above, according to the present invention, at the time of transmitting the light signals responsive to the switch status to the control unit, the switch status is informed to the control unit in the form of electronic signals by using, for example, the power supply line. Therefore, even if there occurs a trouble in the transmission of the light signals, it is possible to securely detect the switch status in the control unit. Consequently, the operation of the predetermined load, such as a motor or the like, can be surely controlled. Furthermore, the present invention enables the facilitation of the data communication via the light signals transmitted between the terminal unit and the control unit and the effective backup thereof, and has a substantially significant effect of improving the reliability of operation of the system.

What is claimed is:

1. A data communication system comprising:
a terminal unit for generating signals responsive to status of a plurality of switches;
a control unit for controlling operation of a predetermined load according to the signals transmitted from the terminal unit; and
power supply lines for supplying power required for operation of the terminal unit from the control unit to the terminal unit;
said terminal unit comprising light signal-transmitting means for generating light signals according to operation of the switches and spatially propagating the light signals to the control unit, and electronic signal-transmitting means for generating electronic signals according to the operation of the switches and transmitting the electronic signals to the control unit through the power supply lines; and
said control unit comprising light signal-detecting means for detecting the light signals transmitted by the light signal-transmitting means and controlling the operation of the load, and electronic signal-detecting means for detecting the electronic signals transmitted by the electronic signal-transmitting means through the power supply lines and controlling the operation of the load when the transmission of the light signals from the terminal unit is discontinued;
wherein the power supply lines comprise a plus and a minus line for supplying DC power from the control unit to the terminal unit, the minus line being grounded in the control unit through a first resistor, and the electronic signal-transmitting means located in the terminal unit comprises a plurality of second resistors having different values of resistance, the second resistors being connected in series to the respective switches, and series circuits of the respective switches and the respective second resistors are interposed between the plus line and the minus line, respectively.

2. A data communication system, comprising:
a terminal unit for generating signals responsive to status of a plurality of switches;
a control unit for controlling operation of a predetermined load according to the signals transmitted from the terminal unit; and
power supply lines for supplying power required for operation of the terminal unit from the control unit to the terminal unit;
said terminal unit comprising light signal-transmitting means for generating light signals according to operation of the switches and spatially propagating the light signals to the control unit, and electronic signal-transmitting means for generating electronic signals according to the operation of the switches and transmitting the electronic signals to the control unit through the power supply lines; and
said control unit comprising light signal-detecting means for detecting the light signals transmitted by the light signal-transmitting means and controlling the operation of the load, and electronic signal-detecting means for detecting the electronic signals transmitted by the electronic signal-transmitting means through the power supply lines and controlling the operation of the load when the transmission of the light signals from the terminal unit is discontinued;
wherein the power supply lines comprise a plus line and a minus line for supplying DC power from the control unit to the terminal unit, and an exclusive line for supplying a predetermined voltage to the terminal unit through a first resistor in the control unit, and the electronic signal-transmitting means located in the terminal unit comprises second resistors having different resistance values, the second resistors being connected in series to the respective switches, and series circuits of the respective switches and the respective second resistors are interposed between the exclusive line and the minus line, respectively.

* * * * *